United States Patent Office 3,453,518
Patented July 1, 1969

3,453,518
BATTERY CHARGING CONTROL DEVICE
Ronald E. Rose and Donald W. Stambaugh, Columbus, Ind., assignors to Arvin Industries, Inc., Columbus, Ind., a corporation of Indiana
Filed Oct. 5, 1966, Ser. No. 584,518
Int. Cl. H02j 7/00, 7/04; H01m 45/04
U.S. Cl. 320—5
13 Claims

ABSTRACT OF THE DISCLOSURE

A switching circuit for controlling a power supply to charge a battery and operate a load, separately or simultaneously, or to operate the load with power from the battery. A regulating circuit is provided between the power supply and the battery and comprises a series connected transistor which is controlled by a pair of transistors to apply a high charging current at a low voltage when the charging period is begun, and a low charging current and high voltage as the charging period nears completion.

---

This invention relates to a device which may be used to supply power to a load or to recharge a battery, and more particularly to a device which may be selectively used to supply power from a power supply to a load, or to supply power from a battery to a load, or to recharge a battery while controlling the charging rate.

The invention combines many cooperating components to selectively perform three mutually exclusive functions. First, the device may supply DC power to a load from a power supply; second, the invention may supply DC power to a load from a battery; and finally, the device may supply a charging current to the battery from the power supply. A fourth function, that of simultaneously supplying power to the load from the power supply while recharging the battery, is also provided. When being used to recharge the battery a unique control circuit is energized which automatically regulates both the current and voltage applied by the power supply to the battery.

Therefore, an object of this invention is to provide a means for selectively supplying power to a load from a power supply or from a battery, or supplying power to recharge the battery, or simultaneously supplying power from a power supply to a load and to a battery for recharging the latter. Another object of this invention is to provide a control circuit for regulating both the recharging voltage and current applied to said battery.

Various other objects, advantages, uses and novel features of the invention will become apparent from the following detailed description of the invention and the accompanying drawings, in which.

Figure 1:
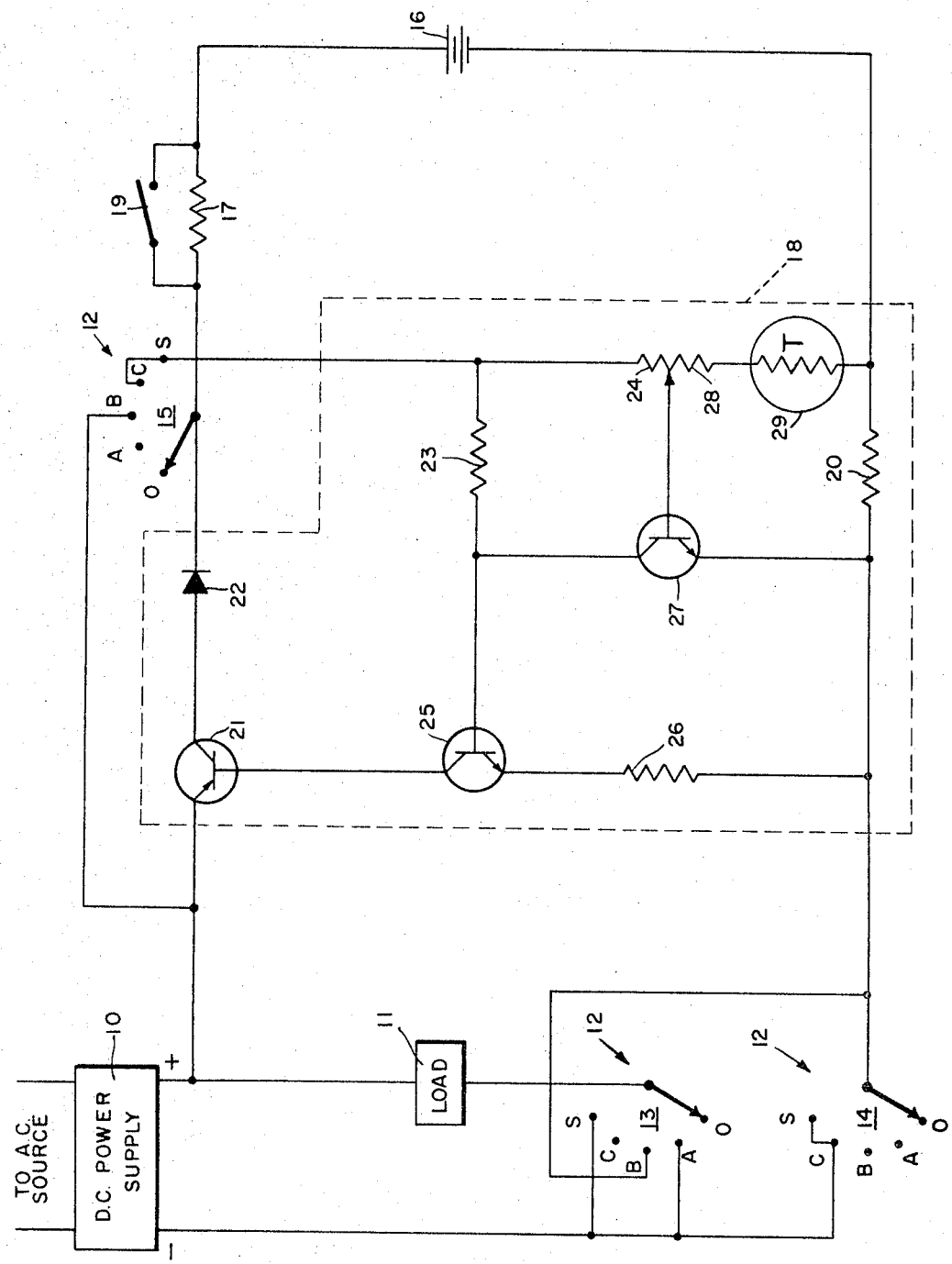
FIG. 1 is a schematic illustration of a circuit embodying the invention.

In the illustrated embodiment of the invention shown in FIG. 1, a power supply 10 has an AC input and a DC output. The positive output terminal is coupled directly to a load 11, while the path for return of current is completed from the load through a switch 12 to the negative output terminal of the power supply 10. Although it can be seen that various types of switches may be used, this embodiment uses a five position multi-layer switch 12 including three wafers 13, 14, and 15. The five positions of the switch include terminals O, A, B, C and S, where O stands for OFF, A for AC, B for BATTERY, C for CHARGE, and S for SIMULTANEOUS. The path for return of current to the power supply 10, is completed through wafer 13 only when switch 12 is in the A or S positions. Current flows from the load to the arm of switch wafer 13, and then from terminal A or S to the negative terminal of power supply 10.

When switch 12 is placed in the B position, the load receives power from a battery 16. The positive terminal of the battery 16 is coupled through a resistor 17 to the arm of wafer 15 and also to the output of a control circuit 18. Terminal B of wafer 15 is connected to the input of a control circuit 18 so that when the switch is in position B control circuit 18 is bypassed. The input of the control circuit is coupled to the positive terminal of the power supply 10, and as described above this terminal is connected to the load. With the switch 12 in the B position the return path for current from the load is established through wafer 13 of switch 12 and through a current sensing resistor 20 of control circuit 18 to the negative terminal of the battery 16. A switch 19 is shown across resistor 17 and when placed in the closed position it shorts out resistor 17. This parallel combination of switch 19 and resistor 17 can be connected in any load current path of the battery which is not common with a power supply load current path.

When switch 12 is placed in the C or S positions, battery 16 is charged by current from the power supply 10. The positive terminal of the power supply is coupled to the input of the control circuit 18, which input is the emitter of a PNP transistor 21. The collector of transistor 21 is coupled to the anode of a diode 22 whose cathode, which is the output of the control circuit, is coupled to the arm of wafer 15. Terminals C and S of wafer 15 are coupled to resistor 23. The other end of resistor 23 is coupled to the base electrode of an NPN transistor 25, whose collector is coupled to the base of transistor 21. The emitter of transistor 25 is coupled through a resistor 26 to the arm of wafer 14. In addition to being coupled to resistor 23, the base of transistor 25 is also coupled to the collector of an NPN transistor 27 whose emitter is coupled to the arm of wafer 14 and to one end of resistor 20. The other end of resistor 20 is coupled through a thermistor 29 to one end of a resistor 28, and it is also coupled to the negative terminal of battery 16. The opposite end of resistor 28 is coupled to the base of transistor 27 and to one end of resistor 24, the other end of resistor 24 being coupled to terminal C and S of wafer 15. It may be convenient in some circumstances to replace resistors 24 and 28 with a potentiometer having its wiper arm coupled to the base of transistor 27. Terminals C and S of wafer 14 are coupled to the negative terminal of power supply 10 as is terminal S of wafer 13.

Figure 2:
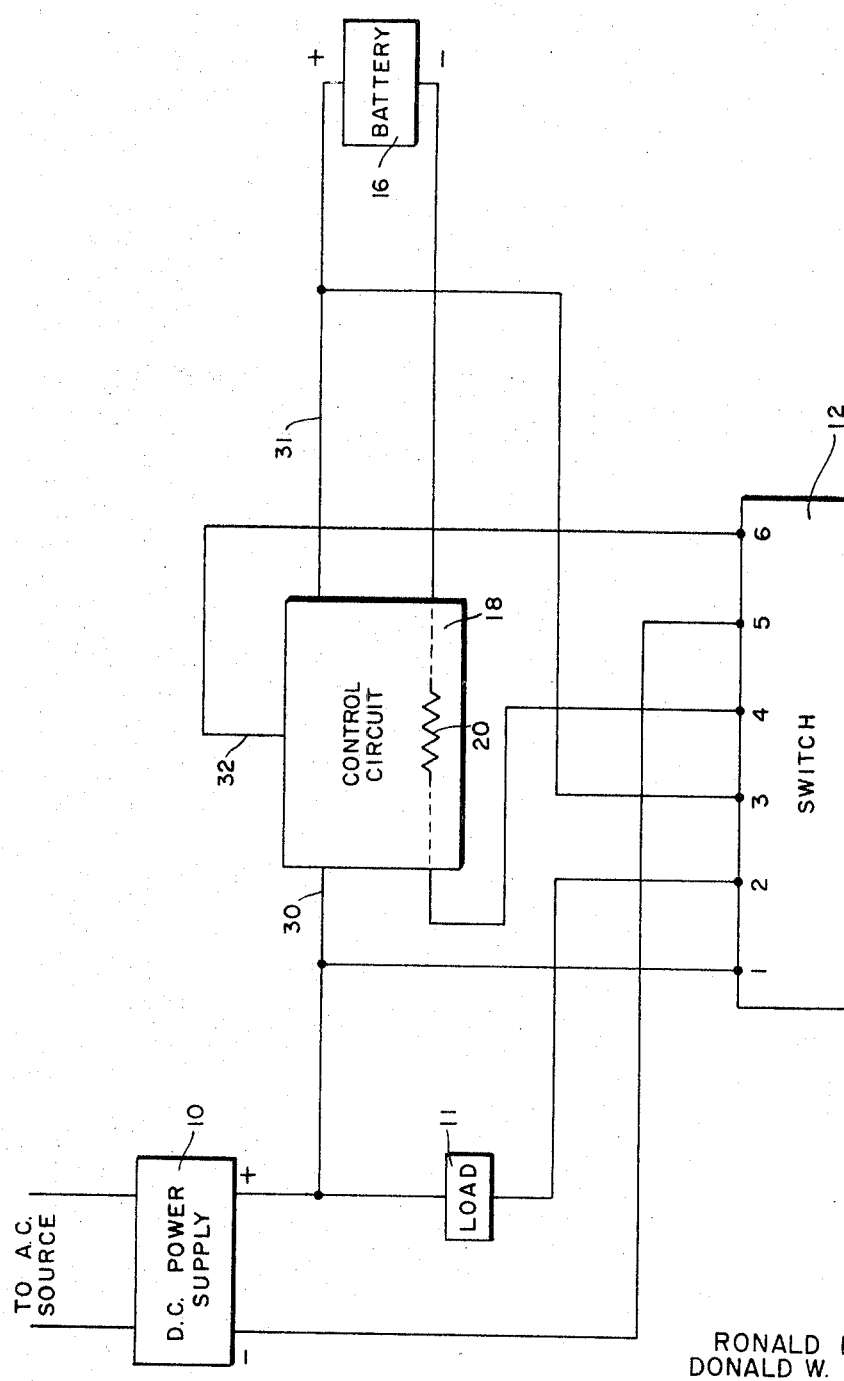
FIG. 2 is a block diagram of the schematic shown in FIG. 1.

FIG. 2 illustrates the same circuit as FIG. 1 with the control circuit and switch shown in block form. As shown, the positive terminal of power supply 10 is coupled to the load 11, to the input 30 of the control circuit 18 and to terminal 1 of the switch 12. The other side of the load is coupled to terminal 2 of the switch 12, and the negative terminal of the power supply 10 is coupled to terminal 5 of the switch. The output 31 of the control circuit 18 is coupled to the positive terminal of the battery 16 and to terminal 3 of the switch. The negative terminal of battery 16 is coupled through sensing resistor 20, in the control circuit, to terminal 4 of the switch and terminal 6 of the switch 12 is coupled to the control input 32 of the control circuit 18.

OPERATION

Referring to FIG. 1 it is seen that when switch 12 is in position O the circuit does not function in any manner since the negative terminal of the power supply 10 is open-circuited, and since the diode 22 prevents any substantial current flow from the battery 16.

When switch 12 is in the A position, the power supply 10 converts AC power to DC power and applies it to the load 11 while wafer 13 provides the path for return current to the power supply 10. In this condition the diode 22 again prevents current flow from the battery 16, and no current can flow from the power supply through the control circuit 18 since transistor 21 can have no base current flow when terminals C and S of wafer 15 are open-circuited.

When the switch 12 is placed in position B, the control circuit 18 is shorted out by wafer 15. Current flows from the positive terminal of battery 16 through resistor 17 and through wafer 15 to the load 11. From load 11 current flows through wafer 13 and through resistor 20 to the negative terminal of battery 16. The power supply 10 is not in the circuit when switch 12 is in the B position since the negative terminal of the power supply is open-circuited by wafers 13 and 14. After repeated discharging and recharging of battery 16, its internal resistance increases and there is a decrease in its output voltage and a change in the circuit charging characteristics. Therefore, switch 19 is included in the circuit and may be closed when the battery has undergone several charge and discharge cycles to compensate for this increase in the battery's internal resistance.

When switch 12 is operated to position C the battery is recharged by current flowing from the power supply 10, through transistor 21, diode 22 and resistor 17 to the positive terminal of battery 16. From the negative terminal of battery 16 the charging current flows through resistor 20 and wafer 14 to the negative terminal of power supply 10. Wafer 13 removes the load from the circuit during the recharging process. The charging current is regulated by control circuit 18 in the following manner. A bias voltage is established across the base-emitter junction of transistor 27. This voltage is developed by the drops across resistors 20 and 28, and thermistor 29. As the charging current which flows through resistor 20 increases, the bias voltage of transistor 27 increases, and its collector current increases. Therefore, less current flows to the base of transistor 25 thereby decreasing its collector current, which in turn decreases the base current of transistor 21, which finally reduces the charging current through transistor 21. The thermistor 29 compensates for any temperature changes to thus provide a uniform charging current to the battery irrespective of changes in the ambient temperature. However, depending on the requirements of the circuit, and on the condition under which it must operate, it may be desirable to use only one of the two components 28 and 29 and to delete the other.

It is seen that by judiciously choosing the components of the control circuit the maximum voltage applied to the battery 16 can also be controlled by circuit 18. That is, an increase in voltage at the power supply or at the battery will cause a greater current to flow through resistor 28 and thermistor 29, thereby causing the same chain reaction described above and increasing the voltage drop across transistor 21. Conversely, it is seen that a low charging voltage or low charging current will cause a greater current to flow through transistor 21 and will cause it to drop less voltage. Therefore, it is seen that control circuit 18 can be thought of as an electronic valve where current flow through the valve is dependent upon the current through the sensing resistor and the bias resistors. Generally, when a battery charge cycle is begun the battery voltage is low. This circuit supplies a large amount of charging current at this time. It is important, however, that little charging current be forced through the battery once it has attained its full charge. Therefore, the above described automatic voltage regulation is important in a circuit of this type, and the component values are chosen to establish a voltage versus current charging characteristic especially suited to the battery 16.

Finally, when switch 12 is operated to its S position it is seen that wafer 13 permits the power supply 10 to supply power to the load 11, and wafer 15 energizes the control circuit 18 to allow battery recharging. Wafer 14 provides a path for the return of charging current to the negative terminal of power supply 10.

With respect to the operation of the invention as it is illustrated in FIG. 2, when the circuit is not operating, all terminals of switch 12 are open-circuited. To supply the load from the power supply 10, terminals 2 and 5 of switch 12 are coupled together. To supply the load from the battery, terminals 1 and 3 are coupled together and terminals 2 and 4 are coupled together. To charge the battery, terminals 3 and 6 are coupled together as are terminals 4 and 5. To operate the load and charge the battery at the same time, terminals 2, 4, and 5 are coupled together and terminals 3 and 6 are coupled together. Finally, as shown in FIG. 2, to recharge the battery without using the control circuit, terminals 1 and 3 are coupled together and terminals 4 and 5 are coupled together.

In summary, it is seen that this invention provides several modes of operation, and that when operated in the C or S mode the control circuit 18 regulates both the charging current and the charging voltage, thereby protecting the battery.

It will be understood that various changes in the details, which have been herein described and illustrated in order to explain the nature of the invention, may be made by those skilled in the art within the principle and scope of the invention, and we desire to be limited only in the scope of the appended claims.

We claim:

1. An electrical control system, comprising a DC power supply, a battery, a load, and switch means having selectively closable first, second, third, fourth, and fifth terminals, said first terminal being connected to one side of each of said power supply and load, said second and fifth terminals being connected to the other sides of said load and power supply respectively, said third terminal being connected to the side of the battery having the same polarity as said one side of the power supply, said fourth terminal being connected to the other side of said battery, whereby said second and fifth terminals can be coupled together and all other terminals left open-circuited to supply power to the load from the power supply, and said first and third terminals can be coupled together and said second and fourth terminals can be coupled together and said fifth terminal left open-circuited to supply power to the load from the battery, and said first and third terminals can be coupled together and said fourth and fifth terminals can be coupled together and said second terminal left open-circuited to recharge the battery by means of the power supply.

2. An electrical control system as described in claim 1, wherein the load current path which is common only to said battery includes a series resistor and a switch in parallel with said series resistor, whereby the voltage supplied to said load by said battery is increased when said switch is closed thereby tending to compensate for an increase in the internal resistance of said battery due to repeated charge-discharge cycles.

3. An electrical control system, comprising a DC power supply, a battery, a load, switch means having selectively closable first, second, third, fourth, fifth, and sixth terminals, and a control circuit means comprising an electronic valve means having two principal conductors, a control input, and a current sensing resistor, one of said principal conductors being coupled to said first terminal and to one side of each of said power supply and said load, the other of said principal conductors being coupled to said third terminal and to the side of said battery having the same polarity as said one side of the power supply, said control input being coupled to said sixth terminal whereby no current may flow through said electronic valve means unless said sixth and third terminals are coupled together, said current sensing resistor in said control circuit means having one end coupled to the other side of said battery and the other end coupled to said fourth terminal, the other sides of said power supply and said load being coupled to said fifth and second terminals respectively, whereby said second and fifth terminals can be coupled together and all other terminals left open-circuited to supply power to the load from the power supply, and said second and fourth terminals can be coupled together and said first and third terminals can be coupled together and all other terminals left open-circuited to supply power to the load from the battery, and said fourth and fifth terminals can be coupled together and said third and sixth terminals can be coupled together and all others left open-circuited to charge the battery from the power supply, and said third and sixth terminals can be coupled together and said fifth, fourth and second terminals can be coupled together and said first terminal left open-circuited to charge the battery and supply power to the load from the power supply simultaneously, and whereby said current sensing resistor and the voltage at the control input of the control circuit means combine to regulate the charging current and voltage.

4. An electrical control system as described in claim 3, wherein said control circuit means comprises first, second, and third transistors each having two principal conducting electrodes and a control electrode, said two principal conducting electrodes of said first transistor comprise said two principal conductors of said electronic valve means; and, a diode in series with the path coupling said battery and third terminal to said other principal conductor, said diode oriented to permit current flow only in the charging direction, one of said principal conducting electrodes of said second transistor being coupled to said control electrode of said first transistor and the other being coupled to one end of a dropping resistor, the other end of which is coupled to said fourth terminal and to one of said principal conducting electrodes of said third transistor, whereby the flow of current through said second transistor controls the flow of charging current through said first transistor, the other of said principal conducting electrodes of said third transistor being coupled to said control electrode of said second transistor and to one end of a load resistor the other end of which is coupled to said control input of said control circuit means whereby the flow of current through said third transistor controls the flow of current through said second transistor, said control electrode of said third transistor being coupled to the junction of first and second bias resistors, the other end of said first bias resistor being coupled to said control input of said control circuit means and the other end of said second bias resistor being coupled to said other side of said battery, whereby the sum of the voltage drops across said current sensing resistor and said second bias resistor establishes the bias for said third transistor thereby controlling the current flow through said third transistor.

5. An electrical control system as described in claim 4, wherein said second bias resistor is a thermistor.

6. An electrical control system as described in claim 4, wherein said other end of said second bias resistor, coupled to said other side of said battery, is coupled through a thermistor to said other side of said battery.

7. An electrical control system as described in claim 4, wherein said first and second bias resistors comprise a potentiometer having the arm thereof coupled to said control electrode of said third transistor.

8. An electrical control system as described in claim 4, wherein the load current path which is common only to said battery includes a series resistor and a switch in parallel with said series resistor whereby the voltage supplied to said load by said battery is increased when said switch is closed thereby tending to compensate for an increase in the internal resistance of said battery due to repeated charge-discharge cycles.

9. A control circuit means for use in recharging a battery by means of a DC power supply, comprising a current sensing resistor and first, second, and third transistors each having two principal conducting electrodes and a control electrode, one of said principal conducting electrodes of said first transistor being coupled to one side of said power supply and the other of said principal conducting electrodes of said first transistor being coupled to the one side of said battery having the same polarity as said one side of said power supply, one of said principal conducting electrodes of said second transistor being coupled to said control electrode of said first transistor and the other said principal conducting electrode of said second transistor being coupled to one end of a dropping resistor the other end of which is coupled to the other side of said power supply and to one of said principal conducting electrodes of said third transistor, whereby the flow of current through said second transistor controls the flow of charging current through said first transistor, the other of said principal conducting electrodes of said third transistor being coupled to said control electrode of said second transistor and to one end of a resistor the other end of which is coupled to said one side of said battery, whereby the flow of current through said third transistor controls the flow of current through said second transistor, said control electrode of said third transistor being coupled to the junction of first and second bias resistors, the other end of said first bias resistor being coupled to said one side of said battery and the other end of said second bias resistor being coupled to the other side of said battery, said current sensing resistor coupled between said other sides of said power supply and battery whereby the sum of the voltage drops across said current sensing resistor and said second bias resistor establishes the bias for said third transistor thereby controlling the current flow through said third transistor.

10. A control circuit means as described in claim 9, wherein said second bias resistor is a thermistor.

11. A control circuit means as described in claim 9, wherein said other end of said second bias resistor, coupled to said other side of said battery, is coupled through a thermistor to said other side of said battery.

12. A control circuit means as described in claim 9, wherein said first and second bias resistors comprise a potentiometer having the arm thereof coupled to said control electrode of said third transistor.

13. A control circuit means as described in claim 9, wherein the path coupling said other principal conducting electrode of said first transistor to said one side of said battery includes a diode oriented as to allow current flow only in the charging direction.

References Cited

UNITED STATES PATENTS

| | | | |
|---|---|---|---|
| 3,041,521 | 6/1962 | Ragosch et al. | 320—28 |
| 3,096,475 | 7/1963 | Brooks | 317—33 X |
| 3,106,665 | 10/1963 | Byles | 322—73 X |
| 3,173,078 | 3/1965 | Farnsworth | 317—33 X |
| 3,214,670 | 10/1965 | Schaf | 307—66 X |
| 3,329,881 | 7/1967 | Tolmie | 307—66 X |
| 3,350,618 | 10/1967 | Barney et al. | 320—5 |
| 3,305,725 | 2/1967 | Huge et al. | 320—39 X |
| 3,310,729 | 3/1967 | Burgess et al. | 323—22 X |

JOHN F. COUCH, *Primary Examiner.*

S. WEINBERG, *Assistant Examiner.*

U.S. Cl. X.R.

307—66; 320—35, 39